H. F. FRENCH.
ELECTRIC BATTERY.
APPLICATION FILED APR. 26, 1920.
1,416,704.
Patented May 23, 1922.
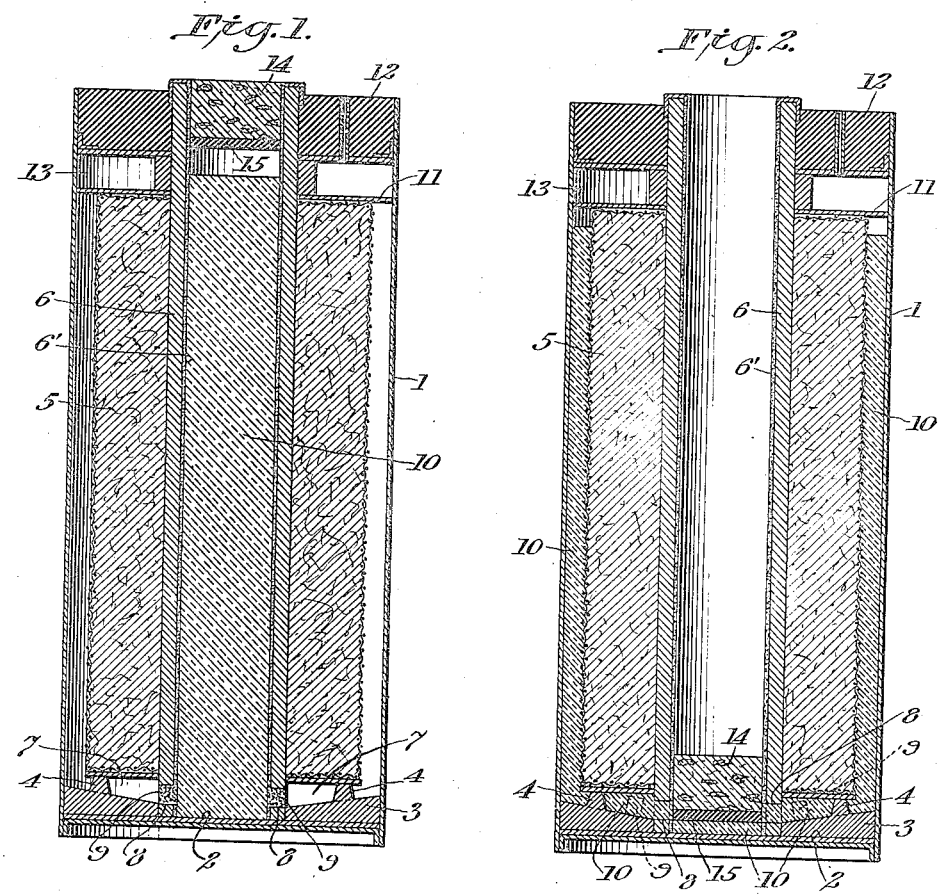
Inventor
Harry F. French
By Byrnes Townsend & Brickenstein,
Attorneys

UNITED STATES PATENT OFFICE.

HARRY F. FRENCH, OF FREMONT, OHIO, ASSIGNOR TO NATIONAL CARBON COMPANY, INC., A CORPORATION OF NEW YORK.

ELECTRIC BATTERY.

1,416,704.	Specification of Letters Patent.	Patented May 23, 1922.

Application filed April 26, 1920. Serial No. 376,725

*To all whom it may concern:*

Be it known that I, HARRY F. FRENCH, a citizen of the United States, residing at Fremont, in the county of Sandusky and State of Ohio, have invented certain new and useful Improvements in Electric Batteries, of which the following is a specification.

This invention relates to dry cells of the deferred action type which are rendered active by a suitable mechanical manipulation.

The object of the invention, generally speaking, is to secure a cell which is simple in construction and adapted to be activated in a simple manner. This object is attained by providing within the cell a hermetically closed excitant receptacle and means by which the excitant may be forced from the receptacle into operative position. The electrodes have a relative position which is not changed on activation, and the container for the excitant is so arranged as not to increase the volume of the cell. A central hollow carbon electrode is preferably utilized for the receptacle.

Referring to the particular form chosen for illustration in the drawings:

Fig. 1 is a central longitudinal section of the cell in the inactive condition.

Fig. 2 is a similar section showing the cell after it has been activated.

An ordinary cylindrical zinc can 1 serves as a container and as the negative electrode. An insulating disk 2 is fitted in the bottom of the can and above this is placed an insulating ring 3 having a plurality of upwardly projecting bosses 4. Various materials may be utilized for the insulating ring such as molded hard pitch, hard rubber and similar substances.

A bobbin type cathode is utilized consisting of a moist depolarizing mix 5 molded around a central hollow carbon electrode 6 having its ends projecting from the mix. The carbon electrode is waterproofed in any suitable manner without insulating the active surface for a purpose to be referred to later. This has been done for example, by impregnating the carbon electrode with paraffin and coating the interior with paraffin 6'. The bobbin is of such form that it is spaced away from the can at all points. The lower projecting end of the carbon electrode is fitted in the ring 3 and the bottom of the mix rests upon the bosses 4 and is thereby spaced from the ring to provide an intermediate passage 7. A plurality of openings 8 are provided in the lower end of the carbon electrode in a suitable position to connect the passage 7 with the space between the mix and zinc electrode. The openings 8 are provided with readily removable closures such as paraffin plugs 9 which close the openings and retain the activating material 10 in the hollow carbon when the cell is in the inactive condition. At the upper end the mix bobbin is spaced from the can by means of an insulating disk 11. Over this is placed an ordinary pitch seal closure 12 and intermediate to the disk 11 and seal 12 an air chamber 13 is usually provided.

In the form illustrated, the hollow carbon electrode is substantially filled with a supply of activating material, such as paste of suitable consistency comprising flour and water and preferably, but not necessarily, containing electrolyte. The quantity of paste is preferably sufficient to practically fill the space between the zinc can and mix when the cell is later activated. I have found that if an untreated carbon electrode is used as a container for the paste, moisture will escape slowly and the paste will be more or less dried out. By utilizing a carbon electrode treated in the manner described, this is prevented. At the upper end the hollow carbon electrode is provided with any suitable closure. In the drawings I have shown a closure adapted to serve as an ejector for applying pressure to the paste. The ejector consists of a cork stopper 14 movable in the hollow carbon electrode when sufficient pressure is applied thereto and a resilient rubber sealing disk 15 below the cork stopper. The treated carbon electrode and stopper provide the hermetically closed receptacle previously mentioned.

To place the cell in action, the user ejects the paste from the hollow carbon electrode by applying pressure to the ejector. The application of pressure will remove the paraffin plugs from the lower end of the carbon electrode, brush them aside, and force the paste out of said electrode into the space between the lower end of the mix and the insulating ring and thence up into the space between the mix and zinc can.

In the form illustrated, a rubber disk is utilized in combination with the cork stopper because if the cork stopper is sufficiently tight to prevent evaporation, it will be difficult to force it through the passageway in the carbon electrode. When the cork stopper is forced downwardly as far as possible, the openings in the lower end of the electrode will be closed by the stopper as shown in Fig. 2.

It will be evident that it is within the scope of my invention to utilize a closure and ejector which are independent.

The application of paste to the space between the zinc electrode and mix permits the cell to immediately reach its maximum current producing capacity. Another advantage of the construction is that all of the elements are contained in a cell which occupies no more space in the inactive than in the active condition.

Having described my invention, what I claim is:—

1. In an electric cell of the kind described, the combination of a metallic electrode and a depolarizing mix incapable of relative adjustment and having a space therebetween, and a receptacle within the cell containing a supply of activating material adapted to be ejected from the receptacle by application of sufficient pressure and forced into the space between the electrode and mix.

2. In an electric cell of the kind described, the combination of a metallic electrode and a depolarizing mix incapable of relative adjustment and having a space therebetween, and a hermetically closed receptacle within the cell containing a supply of activating material adapted to be ejected from the receptacle by application of sufficient pressure and forced into the space between the electrode and mix.

3. In an electric cell of the kind described, the combination of positive and negative electrodes incapable of relative adjustment and having a space therebetween, one of said electrodes having a chamber therein adapted to be connected to the space between the electrodes, and a supply of activating material in the chamber adapted to be ejected therefrom and forced into the space intermediate the electrodes.

4. In an electric cell of the kind described, the combination of a metallic electrode, a depolarizing mix bobbin spaced therefrom, and a hollow carbon electrode containing a supply of activating material adapted to be ejected therefrom and transferred to the space between the mix and metallic electrode.

5. In an electric cell of the kind described, the combination of a metallic electrode, a depolarizing mix bobbin spaced therefrom, and a hollow carbon electrode containing a supply of activating material adapted to be ejected therefrom and transferred to the space between the mix and metallic electrode.

6. In an electric cell of the kind described, the combination of a metallic electrode and a depolarizing mix incapable of relative adjustment and having a space therebetween, a receptacle within the cell containing a supply of activating material, and an ejector adapted to be fitted in said receptacle to transfer the activating material therefrom into the space between the mix and metallic electrode.

7. In an electric cell of the kind described, the combination of a metallic electrode and a depolarizing mix incapable of relative adjustment and having a space therebetween, an hermetically closed receptacle containing a supply of activating material, and an ejector in said receptacle adapted to apply sufficient pressure to the activating material to eject it from the receptacle into the space between the mix and metallic electrode.

8. In an electric cell of the kind described, the combination of a metallic container electrode, a depolarizing mix bobbin therein spaced therefrom, a hollow carbon electrode in the mix, the interior of the hollow carbon being connected with the space between the mix and metallic electrode, a supply of activating material in the hollow carbon adapted to be ejected therefrom by application of sufficient pressure and transferred to the space between the mix and metallic electrode.

9. In an electric cell of the kind described, the combination of a metallic electrode having closures for each end, a depolarizing mix bobbin therein spaced therefrom, a hollow carbon electrode in the mix, a spacer between one end of the mix and the corresponding closure adapted to provide a passageway connecting the interior of the hollow carbon electrode with the space between the mix and metallic electrode and a supply of activating material in the hollow carbon electrode adapted to be ejected therefrom and transferred to the space between the mix and metallic electrode.

10. In an electric cell of the kind described, the combination of a metallic container electrode, a depolarizing mix bobbin therein spaced therefrom, a hollow carbon electrode in the mix having openings leading to the hollow interior of the carbon, a spacer between the lower end of the mix and the bottom of the container having passageways adjacent the openings in the hollow carbon connecting with the space between the mix and metallic electrode and a supply of activating material in the hollow carbon electrode adapted to be ejected therefrom and transferred to the space between the mix and metallic electrode.

11. In an electric cell of the kind described, the combination of a metallic container electrode, a depolarizing mix bobbin therein spaced therefrom, a hollow carbon electrode in the mix having openings near the lower end, removable closures for said openings, a spacer between the bottom of the mix and the bottom of the container having passageways adjacent the openings connecting with the space between the metallic electrode and the mix, a supply of conducting paste in said hollow carbon electrode and a plunger in the carbon electrode above the activating material adapted when sufficient pressure is applied thereto to force the removable closures from the end of the carbon electrode and eject the paste from the carbon electrode into the space between the mix and metallic electrode to activate the cell.

In testimony whereof, I affix my signature.

HARRY F. FRENCH.